(12) United States Patent
Ogura (10) Patent No.: US 11,875,142 B2
(45) Date of Patent: Jan. 16, 2024

(54) INFORMATION PROCESSING APPARATUS, INFORMATION PROCESSING SYSTEM, AND INFORMATION PROCESSING METHOD

(71) Applicant: Yoshimitsu Ogura, Kanagawa (JP)

(72) Inventor: Yoshimitsu Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/083,498

(22) Filed: Oct. 29, 2020

(65) Prior Publication Data

US 2021/0132938 A1 May 6, 2021

(30) Foreign Application Priority Data

Nov. 1, 2019 (JP) .................................. 2019-200138
Sep. 4, 2020 (JP) .................................. 2020-148932

(51) Int. Cl.
*G06F 9/445* (2018.01)
*G06F 8/65* (2018.01)
*H04L 67/00* (2022.01)

(52) U.S. Cl.
CPC ................ *G06F 8/65* (2013.01); *H04L 67/34* (2013.01)

(58) Field of Classification Search
CPC . G06F 8/65; G06F 8/71; G06F 9/4411; G06F 8/60; H04L 67/34
USPC .................................................. 717/168–178
See application file for complete search history.

(56) References Cited

U.S. PATENT DOCUMENTS

| 6,074,435 | A | * | 6/2000 | Rojestal | ..................... G06F 8/65 717/173 |
| 9,411,576 | B2 | * | 8/2016 | Hocker | ..................... G06F 8/65 |
| 2014/0282470 | A1 | * | 9/2014 | Buga | ..................... G06F 8/65 717/170 |
| 2015/0347121 | A1 | * | 12/2015 | Harumoto | ........... H04L 67/2871 717/172 |
| 2016/0291962 | A1 | | 10/2016 | Michishita | |

(Continued)

FOREIGN PATENT DOCUMENTS

| JP | 2006-252094 | 9/2006 |
| JP | 2010-176246 | 8/2010 |

(Continued)

OTHER PUBLICATIONS

Japanese Office Action for 2020-148932 dated Sep. 12, 2023.

*Primary Examiner* — Chuck O Kendall
(74) *Attorney, Agent, or Firm* — IPUSA, PLLC (57) ABSTRACT

An information processing apparatus includes a memory, and a processor coupled to the memory and configured to acquire first update data used to update a program, and including first version information of the program, from another apparatus connected via a network. The program causes the information processing apparatus to execute a process. The processor is further configured to acquire second version information of second update data from the other apparatus in response to an instruction to stop the operation of the information processing apparatus. The second version information is a latest version of the program available from the other apparatus. The processor is further configured to update the program based on the first update data in a case where the first version information matches the second version information.

11 Claims, 10 Drawing Sheets

(56) References Cited

U.S. PATENT DOCUMENTS

| | | | |
|---|---|---|---|
| 2019/0050296 A1* | 2/2019 | Luo | G06F 11/1456 |
| 2019/0073211 A1* | 3/2019 | Kojima | G06F 8/65 |
| 2019/0179627 A1 | 6/2019 | Sugiyama et al. | |
| 2020/0019393 A1* | 1/2020 | Vichare | G06N 20/00 |
| 2020/0097498 A1* | 3/2020 | Tang | G06F 11/1464 |

FOREIGN PATENT DOCUMENTS

| | | |
|---|---|---|
| JP | 2016-197380 | 11/2016 |
| JP | 2018-022361 | 2/2018 |
| JP | 6501595 | 4/2019 |

* cited by examiner

INFORMATION PROCESSING APPARATUS, INFORMATION PROCESSING SYSTEM, AND INFORMATION PROCESSING METHOD

CROSS-REFERENCE TO RELATED APPLICATIONS

The present application claims priority under 35 U.S.C. § 119 to Japanese Patent Application No. 2019-200138 filed on Nov. 1, 2019 and Japanese Patent Application No. 2020-148932 filed on Sep. 4, 2020, the entire contents of which are incorporated herein by reference.

BACKGROUND OF THE INVENTION

1. Field of the Invention

The disclosures herein relate to an information processing apparatus, an information processing system, and an information processing method.

2. Description of the Related Art

An information processing apparatus that has a program installed and periodically checks whether latest versions of the program are available via a network is known. If there is a latest version, the information processing apparatus automatically downloads the latest version and updates the program with the latest version.

The program is automatically updated while the information processing apparatus is in operation (while the power is turned on). However, if the information processing apparatus is in operation, the information processing apparatus is highly likely to be used by a user. If the automatic update is performed when the information processing apparatus is being used by the user, the usability of the information processing apparatus may be decreased. For example, functions related to the program to be updated may be unable to be used, or the operation of the information processing apparatus may become slow due to the update load. Further, depending to the update contents, the information processing apparatus may be required to be restarted even when the information processing apparatus is being used by the user.

It may be contemplated that the automatic update may be performed when the information processing apparatus is not used by the user. However, if the user continues to use the information processing apparatus after the information processing apparatus is started (the power is turned on) until the information processing apparatus is stopped (the power is turned off), there may be no chance to perform the automatic update. Therefore, a delay in updating the program may be prolonged.

RELATED-ART DOCUMENTS

Patent Documents

Patent Document 1: Japanese Unexamined Patent Application Publication No. 2006-252094
Patent Document 2: Japanese Unexamined Patent Application Publication No. 2016-197380

SUMMARY OF THE INVENTION

It is a general object of the described embodiments to avoid a prolonged delay in updating a program.

According to at least one embodiment, an information processing apparatus includes a memory, and a processor coupled to the memory and configured to acquire first update data used to update a program and including first version information of the program, from another apparatus connected via a network. The program causes the information processing apparatus to execute a process. The processor is further configured to acquire second version information of second update data from the other apparatus in response to an instruction to stop the operation of the information processing apparatus. The second version information is a latest version of the program available from the other apparatus. The processor is further configured to update the program based on the first update data in a case where the first version information matches the second version information.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

According to at least one embodiment, a prolonged delay in updating a program can be avoided.

Figure 1:
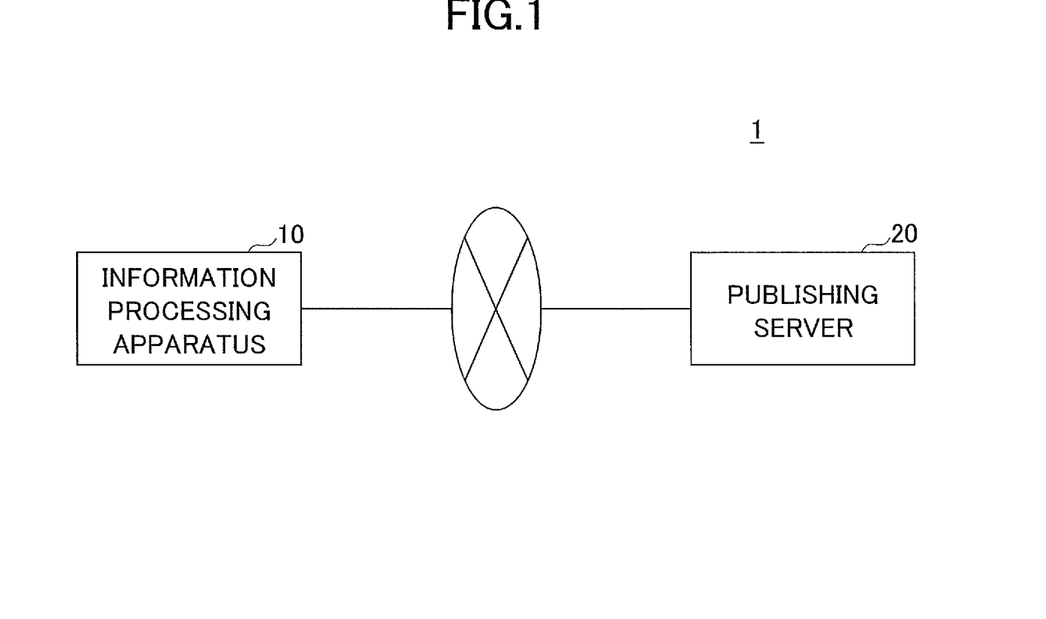
FIG. 1 is a diagram illustrating an example configuration of an information processing system 1 according to a first embodiment.

In the following, embodiments of the present invention will be described with reference to the accompanying drawings. FIG. 1 is a diagram illustrating an example configuration of an information processing system 1 according to a first embodiment. In FIG. 1, the information processing system 1 includes an information processing apparatus 10 and a publishing server 20. The information processing apparatus 10 and the publishing server 20 are connected to each other via a network (wired or wireless) such as a local area network (LAN) or the Internet. Note that a plurality of information processing apparatuses 10 may be connected to the publishing server 20.

The publishing server 20 is one or more computers that publish latest versions of a group of programs. The group of programs causes the information processing apparatus 10 to execute processes. In the present embodiment, for the sake of description, a program published by the publishing server 20 is firmware of the information processing apparatus 10. Note that "publishing a group of programs" refers to making a group of programs available (making a group of programs accessible).

The information processing apparatus 10 may be an image forming apparatus such as a printer or a multifunction peripheral. The information processing apparatus 10 automatically acquires (downloads) a program (firmware) published by the publishing server 20, and updates the program. Note that "updating the program" refers to updating the information processing apparatus 10 by the program, that is, activating the program in the information processing apparatus 10. Therefore, after program is updated, some processes of the information processing apparatus 10 are controlled by the program. In the present embodiment, as an example, a program is updated with the latest version. However, a new program may be installed. By installing the new program, the new program is activated in the information processing apparatus 10. That is, an update and installation are examples of activation (an update of the information processing apparatus 10).

Figure 2:
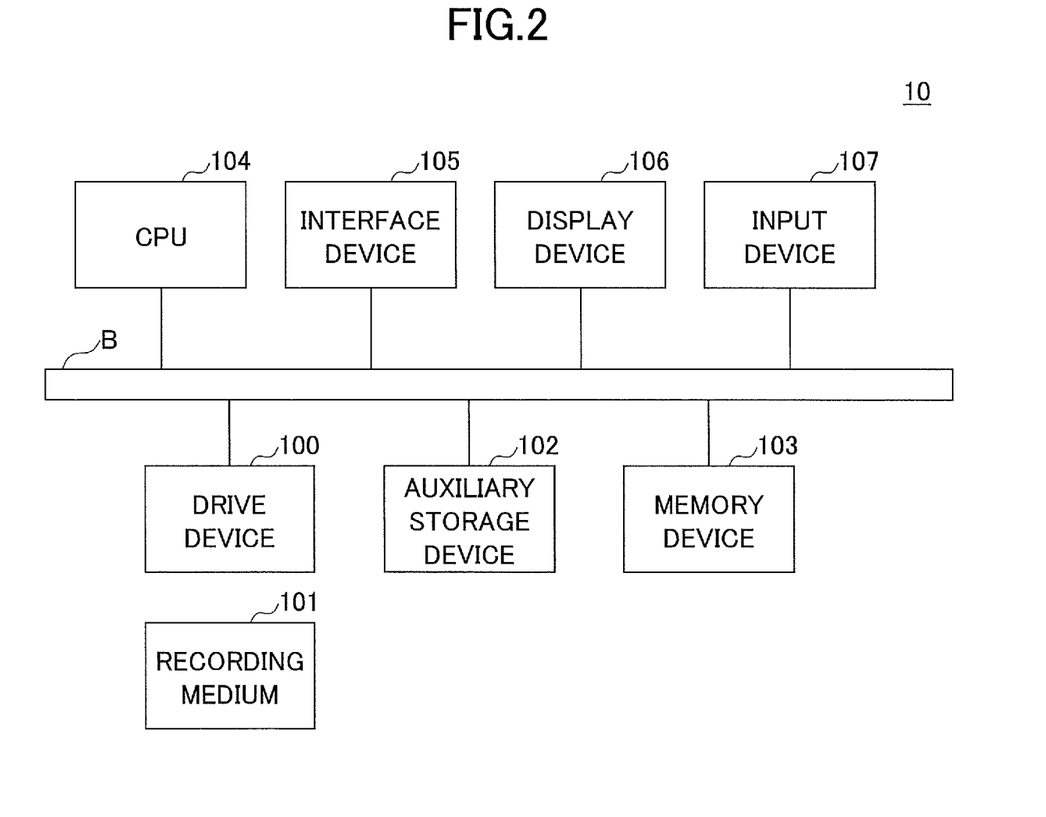
FIG. 2 is a diagram illustrating an example of a hardware configuration of an information processing apparatus 10 according to the first embodiment.

FIG. 2 is a diagram illustrating an example of a hardware configuration of the information processing apparatus 10 according to the first embodiment. The information processing apparatus 10 of FIG. 2 includes a drive device 100, an auxiliary storage device 102, a memory device 103, a CPU 104, an interface device 105, a display device 106, and an input device 107, which are connected to each other via a bus B.

Programs for implementing processes in the information processing apparatus 10 are provided by a recording medium 101 such as a CD-ROM. When the recording medium 101 storing a program is set in the drive device 100, the program is installed in the auxiliary storage device 102 from the recording medium 101 via the drive device 100. However, the program is not necessarily installed from the recording medium 101, and may be downloaded from another computer via a network. The auxiliary storage device 102 stores the installed program, and also stores necessary files and data.

In response to an instruction to start a program, the memory device 103 reads the program from the auxiliary storage device 102 and stores the program. The CPU 104 implements functions of the information processing apparatus 10 in accordance with the program stored in the memory device 103. The interface device 105 is used as an interface for connecting to a network. The display device 106 displays a graphical user interface (GUI) provided by a program. The input device 107 includes a keyboard and a mouse, buttons, or a touch panel, and is used to input various operation instructions. Note that the display device 106 and the input device 107 may be integrally formed as an operation panel.

Figure 3:
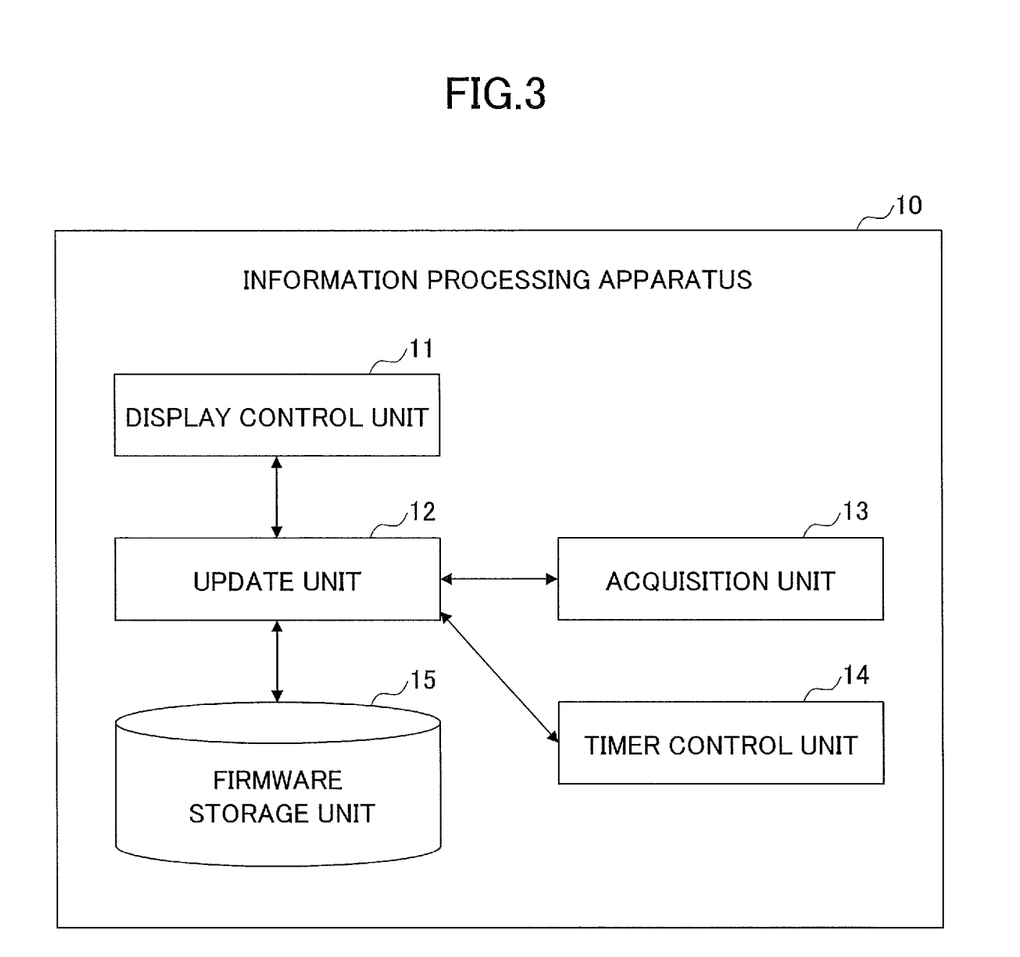
FIG. 3 is a diagram illustrating an example of a functional configuration of the information processing apparatus 10 according to the first embodiment.

FIG. 3 is a diagram illustrating an example of a functional configuration of the information processing apparatus 10 according to the first embodiment. In FIG. 3, the information processing apparatus 10 includes a display control unit 11, an update unit 12, an acquisition unit 13, and a timer control unit 14. These functional units are implemented by processes that one or more programs installed in the information processing apparatus 10 cause the CPU 104 to execute. Further, the information processing apparatus 10 includes a firmware storage unit 15. The firmware storage unit 15 may be implemented by a storage device that can be connected to the auxiliary storage device 102 or the information processing apparatus 10 via a network.

The display control unit 11 controls the display of a screen on the display device 106, and controls a process in accordance with a user's input on the screen or into the input device 107.

The update unit 12 controls a process for updating firmware in the information processing apparatus 10. The acquisition unit 13 acquires version information of firmware published by the publishing server 20, and acquires the firmware itself. The timer control unit 14 measures a lapse of a predetermined period of time. Version information is information indicating the version of firmware.

Figure 4:
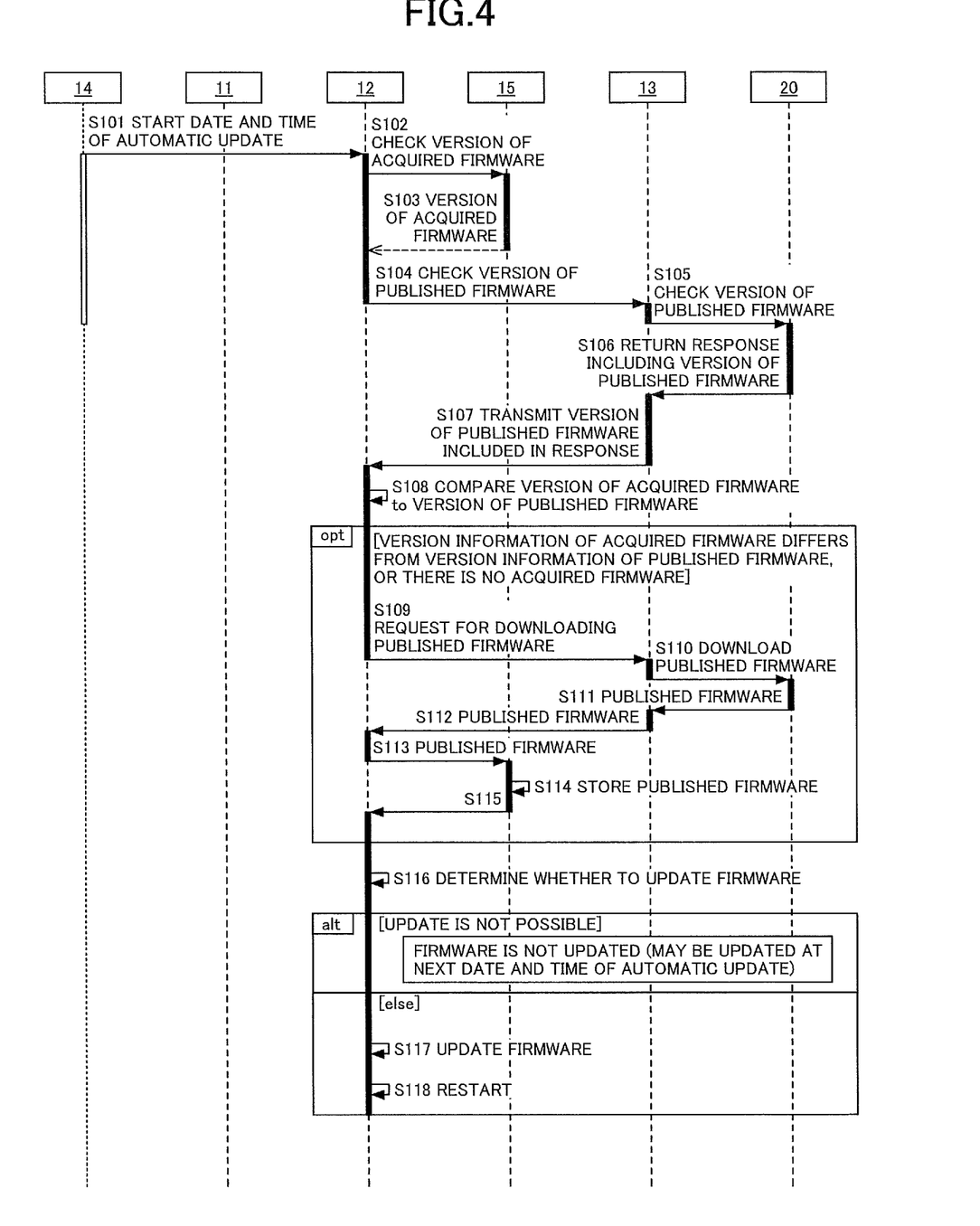
FIG. 4 is a sequence diagram illustrating an example of a process performed by the information processing apparatus 10 while in operation.

In the following, a process performed by the information processing apparatus 10 will be described. FIG. 4 is a sequence diagram illustrating an example of a process performed by the information processing apparatus 10 while in operation.

For example, the timer control unit 14 detects the start date and time of an automatic update of firmware based on an update interval that is preset in the information processing apparatus 10 (S101). In response to the detection of the start date and time of the automatic update, the update unit 12 refers to the firmware storage unit 15, and checks version information of firmware update data already acquired from the publishing server 20 (S102 and S103). The "firmware update data already acquired from the publishing server 20" is hereinafter referred to as "acquired firmware". The process illustrated in FIG. 4 may be performed periodically at the preset update interval. Note that firmware acquired from the publishing server 20 last time is stored in the firmware storage unit 15. Further, version information may be acquired from corresponding firmware. Alternatively, version information of firmware may be stored in the firmware storage unit 15, separately from the firmware.

Next, the update unit 12 requests the acquisition unit 13 to check the latest version of firmware update data published by the publishing server 20 (S104). The "firmware update data published by the publishing server 20" is hereinafter referred to as "published firmware", which is the latest firmware. In response to the request from the update unit 12, the acquisition unit 13 transmits a request for the version information of the published firmware to the publishing server 20 (S105). The publishing server 20 returns a response including the version information of the published firmware to the acquisition unit 13 (S106). In response to receiving the response, the acquisition unit 13 transmits the version information of the published firmware included in the response to the update unit (S107).

Next, the update unit 12 compares the version information of the acquired firmware to the version information of the published firmware (S108). If the version information of the acquired firmware matches the version information of the published firmware, the process proceeds to step S116 without performing steps S109 through S105.

If the version information of the acquired firmware differs from the version information of the published firmware (or if there is no acquired firmware), the update unit 12 requests the acquisition unit 13 to download (acquire) the published firmware (S109). In response to the request from the update unit 12, the acquisition unit 13 downloads (acquires) the published firmware from the publishing server 20 (S110 and S111). Next, the acquisition unit 13 transmits the published firmware downloaded (acquired) from the publishing server 20 to the update unit 12 (S112). The update unit 12 stores the published firmware in the firmware storage unit 15 (S113 through S115). At this time, the acquired firmware (if any) stored in the firmware storage unit 15 is overwritten by the published firmware. As a result, the published firmware becomes the acquired firmware.

Next, the update unit 12 determines whether to update the firmware (S116). For example, if the information processing apparatus 10 is in a state in which the firmware is unable to be updated (hereinafter referred to as a "non-updatable state"), the update unit 12 determines that the firmware is unable to be updated. If the information processing apparatus 10 is not in the non-updatable state, the update unit 12 determines that the firmware is able to be updated. Examples of the non-updatable state include a state in which a user is using (operating) the information processing apparatus 10, and an update prohibited state (in which updates are prohibited during standard working hours, for example) being set by a user.

If the information processing apparatus 10 is in the non-updatable state, the update unit 12 does not update the firmware. Conversely, if the information processing apparatus 10 is not in the non-updatable state, the update unit 12 updates the firmware of the information processing apparatus 10 based on the acquired firmware stored in the firmware storage unit 15 (S117), and restarts the information processing apparatus 10 (S118). The acquired firmware is removed from the firmware storage unit 15 after the update.

If an update is performed only in accordance with the process of FIG. 4, the firmware would be less likely to be updated with the latest version. For example, if the user sets working hours as update prohibited hours, and the main power of the information processing apparatus 10 is turned off at all times except for the working hours, there would be less chance to update the firmware. Accordingly, in the present embodiment, a process illustrated in FIG. 5 is performed in response to an instruction to turn off the main power of the information processing apparatus 10 (that is, in response to an instruction to stop the operation of the information processing apparatus 10).

Figure 5:
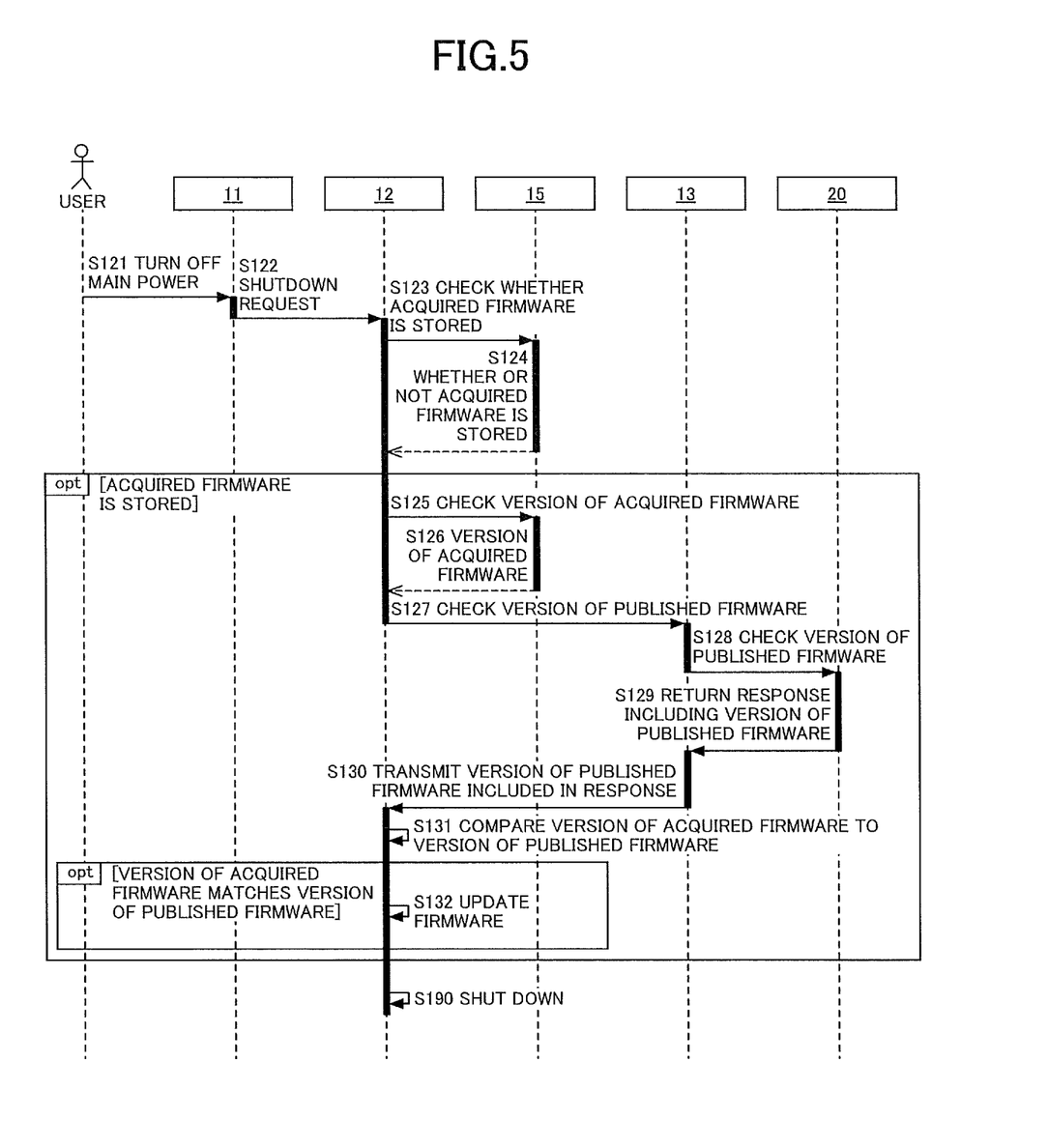
FIG. 5 is a sequence diagram illustrating an example of a process performed by the information processing apparatus 10 in response to an instruction to turn off the main power according to the first embodiment.

FIG. 5 is a sequence diagram illustrating an example of a process performed by the information processing apparatus 10 in response to an instruction to turn off the main power according to the first embodiment.

In response to detecting an instruction to turn off the main power of the information processing apparatus 10 from the user (S121), the display control unit 11 transmits a shutdown request to the update unit 12 (S122).

In response to the shutdown request, the update unit 12 refers to the firmware storage unit 15, and checks whether there is acquired firmware (S123 and S124). That is, the update unit 12 checks whether acquired firmware is stored in the firmware storage unit 15.

If no acquired firmware is stored in the firmware storage unit 15, the update unit 12 shuts down the information processing apparatus 10 (S190).

Conversely, if acquired firmware is stored in the firmware storage unit 15, the update unit 12 checks version information of the acquired firmware stored in the firmware storage unit 15. Next, steps the same as steps S104 through S108 are performed. As a result, the version information of the acquired firmware is compared to version information of published firmware (S127 through S131).

If the version information of the acquired firmware differs from the version information of the published firmware, the update unit 12 shuts down the information processing apparatus 10 (S190). If the version information of the acquired firmware matches the version information of the published firmware, the update unit 12 updates the firmware of the information processing apparatus 10 based on the acquired firmware stored in the firmware storage unit 15 (S132), and shuts down the information processing apparatus 10 (S190).

Accordingly, in the first embodiment, even if the firmware is determined not to be automatically updated in step S116 of FIG. 4, the firmware can be updated before the main power of the information processing apparatus 10 is turned off as along as the latest version of the firmware is downloaded, as described in FIG. 5. For example, even if the user sets working hours as update prohibited hours, and the main power of the information processing apparatus 10 is turned off at all times except for the working hours, the firmware can be updated at a timing when the main power of the information processing apparatus 10 is turned off. Accordingly, a prolonged delay for updating the firmware (program) can be avoided.

Further, in the present embodiment, the firmware is updated as long as the version information of the acquired firmware matches the version information of the published firmware. In other words, the firmware is not updated if the version information of the acquired firmware differs from the version information of the published firmware. Therefore, by the firmware not being updated if the acquired firmware is not the latest version, an unnecessary prolonged shutdown against the user's intention of attempting to shut down (stop) the information processing apparatus 10 is avoided.

Next, a second embodiment will be described. In the second embodiment, only differences from the first embodiment will be described. Therefore, other configurations not described in the second embodiment may be similar to those of the first embodiment.

In the first embodiment, if the version of the acquired firmware differs from the version of the published firmware in step S131, the update is not performed. Therefore, even if the version of the firmware installed on the information processing apparatus 10 is version N and the version of the acquired firmware is version N+1, the update is not performed if the version of published firmware is version N+2. Therefore, according to the second embodiment, even in the above-described case, the firmware installed on the information processing apparatus 10 can be updated to the version N+1.

Figure 6:
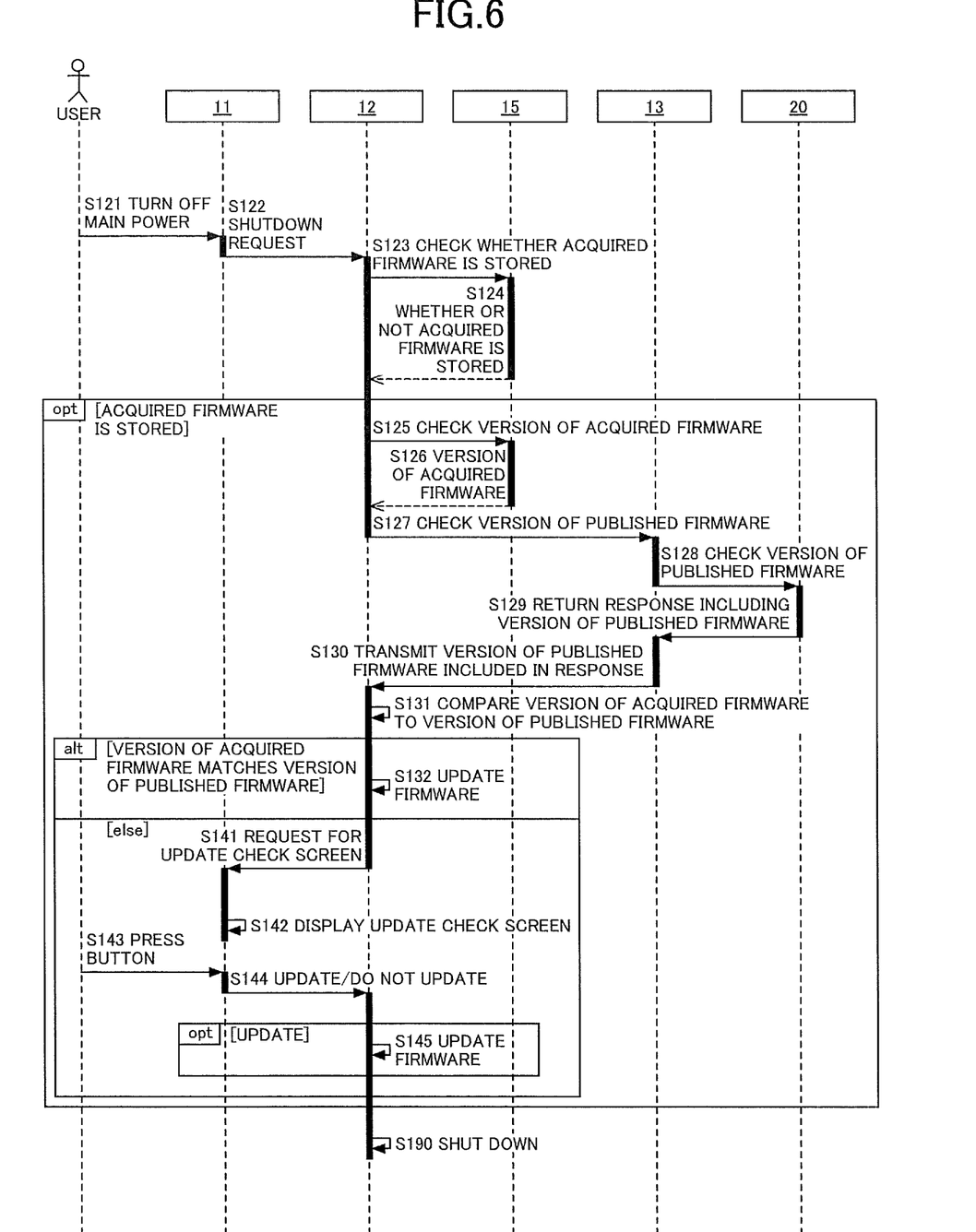
FIG. 6 is a sequence diagram illustrating an example of a process performed by the information processing apparatus 10 in response to the instruction to turn off the main power according to a second embodiment.

FIG. 6 is a sequence diagram illustrating an example of a process performed by the information processing apparatus 10 in response to the instruction to turn off the main power according to the second embodiment. In FIG. 6, steps same as those of FIG. 5 are denoted by the same reference numerals, and a description thereof will be omitted. That is, a part of the process illustrated in FIG. 6 according to the second embodiment is the same as the process illustrated in FIG. 5.

In FIG. 6, if the version information of the acquired firmware differs from the version information of the published firmware, steps S141 through S145 are performed.

Figure 7:
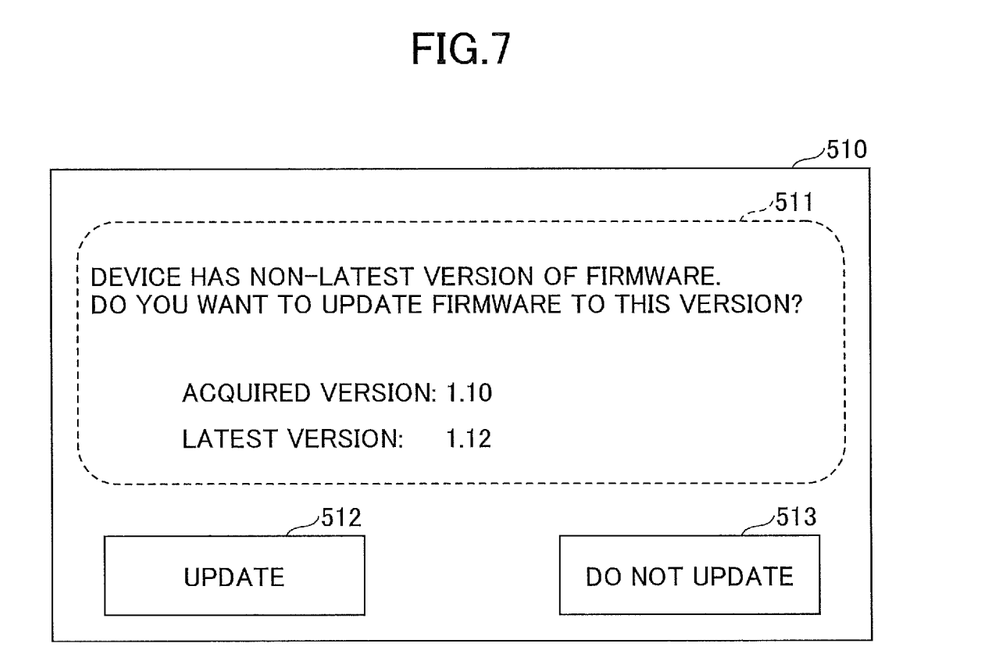
FIG. 7 is a diagram illustrating an example of an update check screen 510 according to the second embodiment.

In step S131, if the version information of the acquired firmware differs from the version information of the published firmware, the update unit 12 requests the display control unit 11 to display an update check screen 510, which displays a message asking whether to update the firmware to the acquired firmware version, which is not the latest version (S141). In response to the request from the update unit 12, the display control unit 11 displays the update check screen 510 on the display device 106 (S142).

FIG. 7 is a diagram illustrating an example of the update check screen 510 according to the second embodiment. In FIG. 7, the update check screen 510 includes a message 511, an "update" button 512, and a "do not update" button 513. The message 511 is a message asking whether the user wishes to update the firmware to the acquired firmware version, which is not the latest version, and the message 511 also includes the acquired version information and the latest version information (the version of the published firmware).

The "update" button 512 is a button for receiving an instruction to update the firmware. The "do not update" button 513 is a button for receiving an instruction not to update the firmware.

In response to detecting the selection of the "update" button 512 or the "do not update" button 513 on the update check screen 510 (S143), the display control unit 11 indicates the selection of the "update" button 512 or the "do not update" button 513 to the update unit 12.

If the user selects the "do not update" button 513, the update unit 12 shuts down the information processing apparatus 10 without updating the firmware (S190). Conversely, if the user selects the "update" button 512, the update unit 12 updates the firmware based on the acquired firmware stored in the firmware storage unit 15 (S145), and shuts down the information processing apparatus 10 (S190).

As described above, according to the second embodiment, even if the acquired firmware is not the latest version, the firmware of the information processing apparatus 10 can be updated to the version of the acquired firmware.

Next, a third embodiment will be described. In the third embodiment, only differences from the first embodiment will be described. Therefore, other configurations not described in the third embodiment may be similar to those of the first embodiment.

In the first embodiment or in the second embodiment, even when the user turns off the main power of the information processing apparatus 10 in order to move the information processing apparatus 10, for example, there may be a possibility that the firmware may be updated if the update condition is met. In such a case, the user is required to wait to move the information processing apparatus 10 until the update of the firmware is complete. In the third embodiment, such an inconvenience can be avoided.

Figure 8:
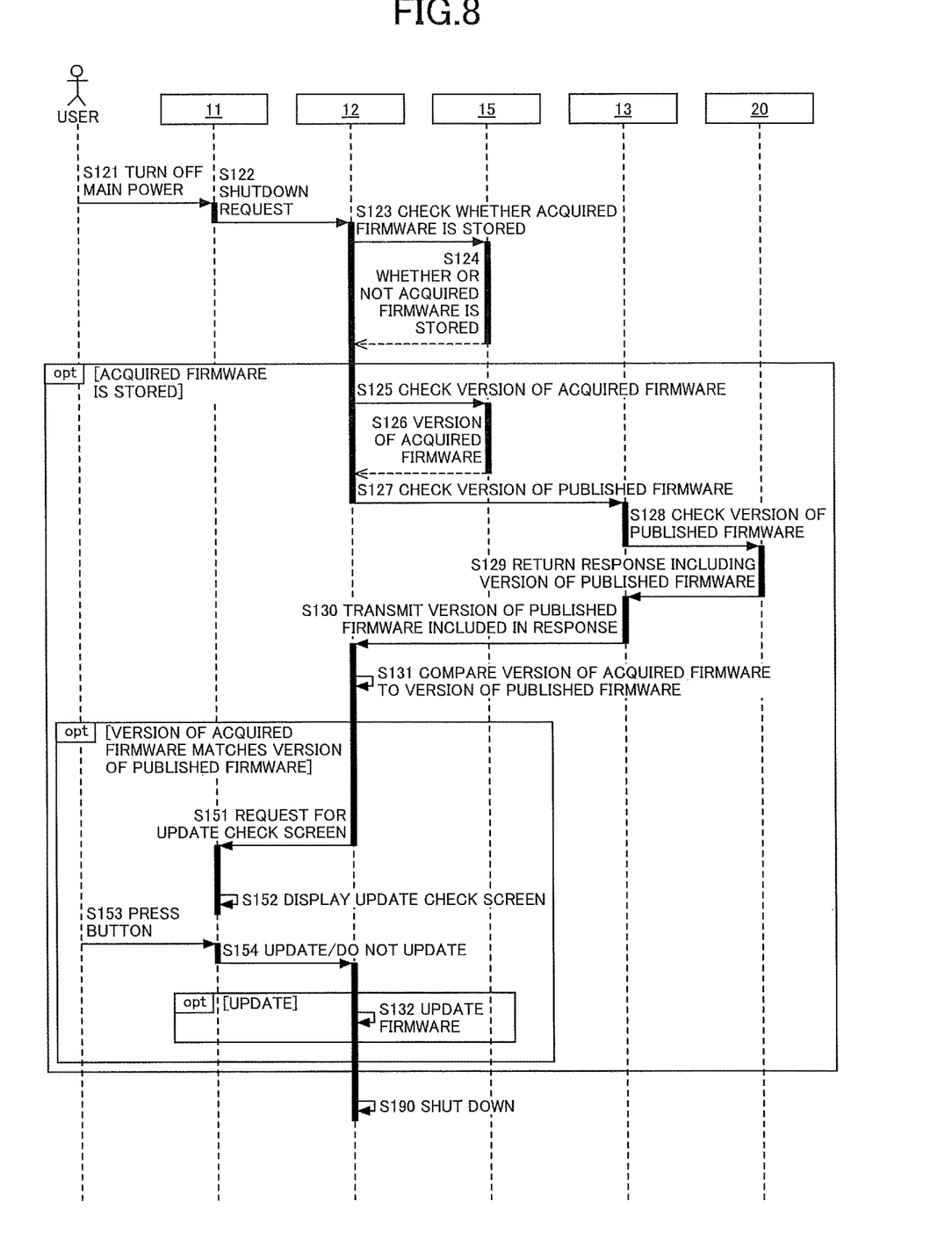
FIG. 8 is a sequence diagram illustrating an example of a process performed by the information processing apparatus 10 in response to the instruction to turn off the main power according to a third embodiment.

FIG. 8 is a diagram illustrating an example of a process performed by the information processing apparatus 10 in response to the instruction to turn off the main power according to the third embodiment. In FIG. 8, steps same as those of FIG. 5 are denoted by the same reference numerals, and a description thereof will be omitted. That is, a part of the process illustrated in FIG. 8 according to the third embodiment is the same as the process illustrated in FIG. 5.

In FIG. 8, if the version information of the acquired firmware matches the version information of the published firmware in step S131, steps S151 through S154 are performed before performing step S132.

Figure 9:
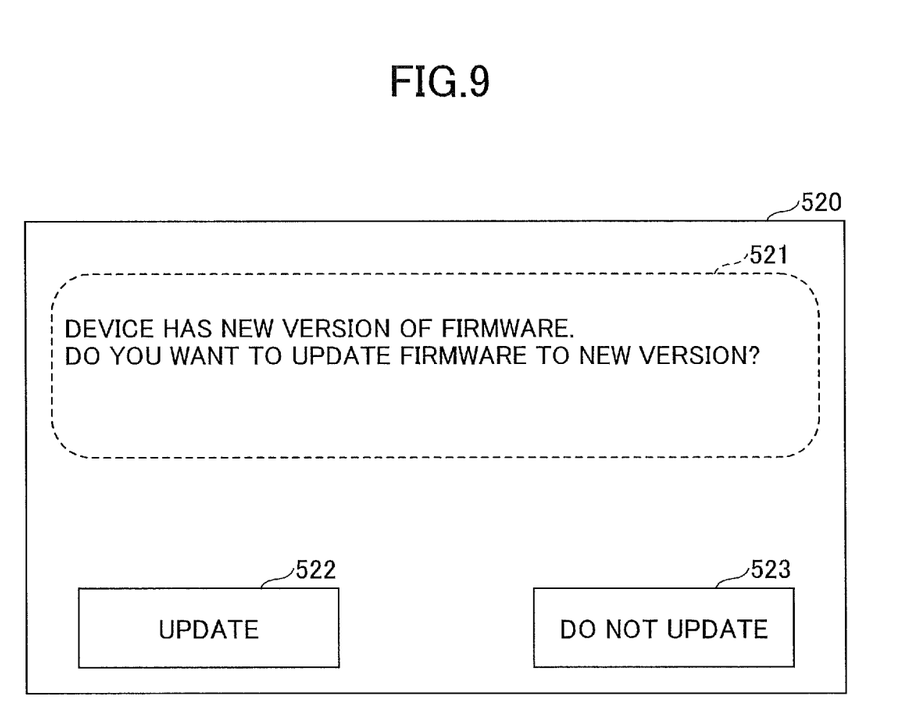
FIG. 9 is a diagram illustrating an example of an update check screen 520 according to the third embodiment.

In step S131, if the version information of the acquired firmware matches the version information of the published firmware, the update unit 12 requests the display control unit 11 to display an update check screen 520, which displays a message asking whether to update the firmware to the acquired version (S151). In response to the request from the update unit 12, the display control unit 11 displays the update check screen 520 on the display device 106 (S152).

FIG. 9 is a diagram illustrating an example of the update check screen 520 according to the third embodiment. In FIG. 9, the update check screen 520 includes a message 521, an "update" button 522, and a "do not update" button 523. The message 521 is a message notifying the user that the acquired firmware version is available and also asking whether the user wishes to update the firmware of the information processing apparatus 10 to the acquired firmware version.

The "update" button 522 is a button for receiving an instruction to update the firmware. The "do not update" button 523 is a button for receiving an instruction not to update the firmware.

In response to detecting the selection of the "update" button 522 or the "do not update" button 523 on the update check screen 520 (S153), the display control unit 11 indicates the selection of the "update" button 522 or the "do not update" button 523 to the update unit 12.

If the user selects the "do not update" button 523, the update unit 12 shuts down the information processing apparatus 10 without updating the firmware (S190). Conversely, if the user selects the "update" button 522, the update unit 12 updates the firmware based on the acquired firmware stored in the firmware storage unit 15 (S155), and shuts down the information processing apparatus 10 (S190).

As described above, according to the third embodiment, even if the update condition is met, the user is asked whether to update the firmware. Therefore, when the user turns off the main power of the information processing apparatus 10 in order to move the information processing apparatus 10, the update of the firmware can be avoided by selecting not to update the firmware.

Note that the third embodiment may be combined with the second embodiment.

Next, a fourth embodiment will be described. In the fourth embodiment, only differences from the third embodiment will be described. Therefore, other configurations not described in the third embodiment may be similar to those of the first embodiment.

In the third embodiment, after the instruction to turn off the main power, the information processing apparatus 10 is required to wait until an operation indicating whether to update the firmware is input by the user on the update check screen 520. If no operation is input on the update check screen 520, the information processing apparatus 10 would remain turned on. In the fourth embodiment, such an inconvenience can be avoided.

Figure 10:
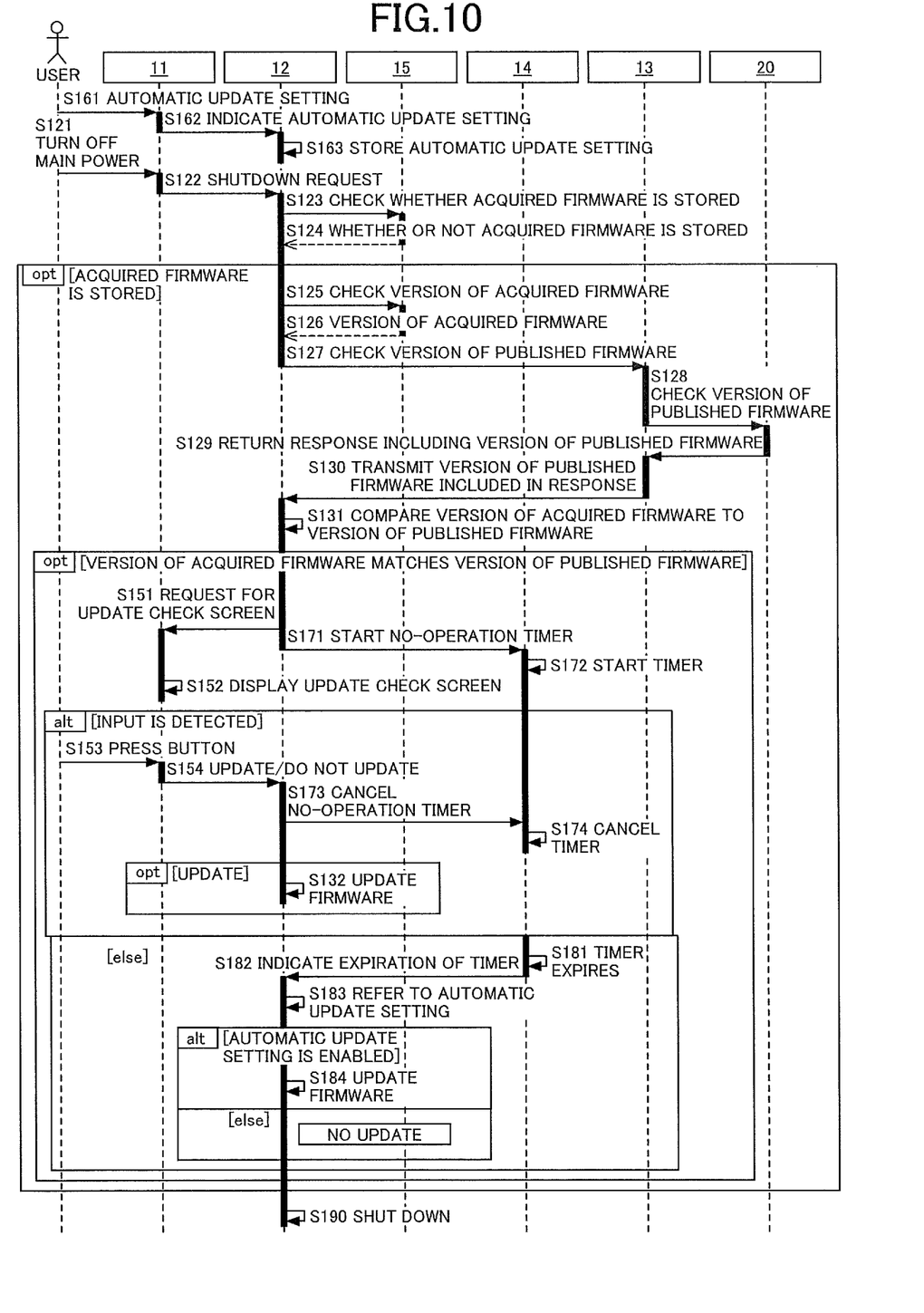
FIG. 10 is a sequence diagram illustrating an example of a process performed by the information processing apparatus 10 in response to the instruction to turn off the main power according to a fourth embodiment.

FIG. 10 is a diagram illustrating an example of a process performed by the information processing apparatus 10 in response to the instruction to turn off the main power according to the fourth embodiment. In FIG. 10, steps same as those of FIG. 8 are denoted by the same reference numerals, and a description thereof will be omitted. That is, a part of the process illustrated in FIG. 10 according to the fourth embodiment is the same as the process illustrated in FIG. 8.

In the fourth embodiment, steps S161 through S163 are performed at any timing before the instruction to turn off the main power is performed. Note that steps S161 through S163 are not required to be performed each time the information processing apparatus 10 is started. Steps S161 through S163 may be formed at least once after the information processing apparatus 10 is started.

Figure 11:
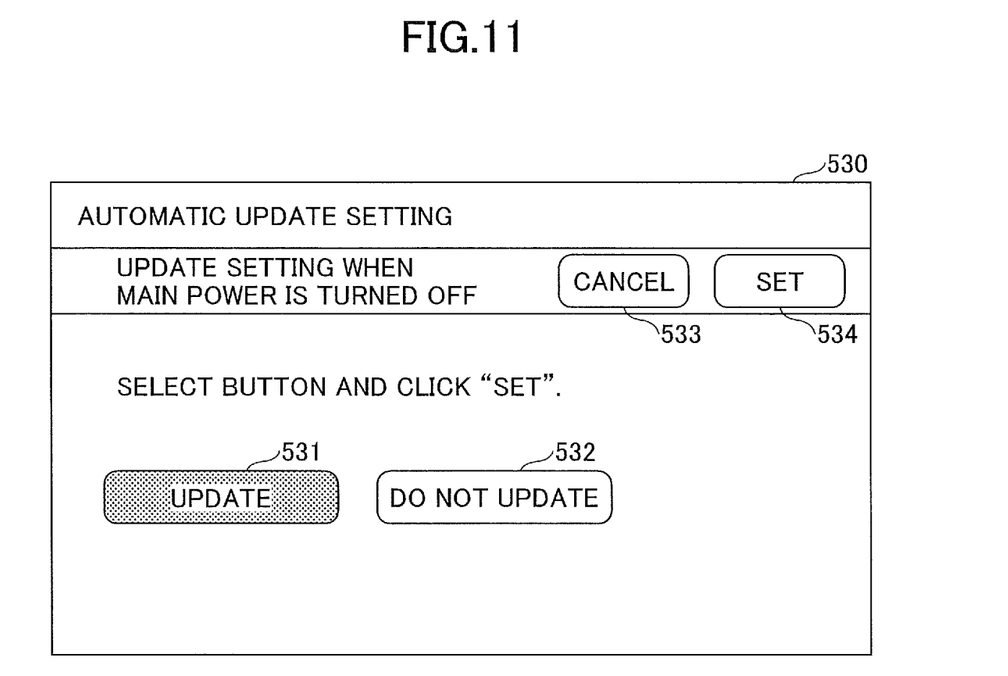
FIG. 11 is a diagram illustrating an example of an automatic update setting screen 530 according to the fourth embodiment.

In step S161, the display control unit 11 receives an automatic update setting input by the user on the automatic update setting screen 530 displayed on the display device 106.

FIG. 11 is a diagram illustrating an example of the automatic update setting screen 530. In FIG. 11, the automatic update setting screen 530 is a screen that allows the user to configure settings as to whether an automatic update of firmware is performed when no operation is input by the user on the update check screen 520. The automatic update setting screen 530 includes buttons 531 through 534.

The button 531 is a button for receiving an instruction to perform an automatic update even when no operation is input by the user on the update check screen 520. The button 532 is a button for receiving an instruction not to perform an automatic update when no operation is input by the user on the update check screen 520.

The button 533 is a button for receiving an instruction to disable the selection of the button 531 or the button 532 and to hide the automatic update setting screen 530. The button 534 is a button for receiving an instruction to enable the selection of the button 531 or the button 532 and to hide the automatic update setting screen 530.

Therefore, step S161 is performed in response to the button 533 or the button 534 being pressed. The automatic update setting input by the user on the automatic update setting screen 530 corresponds to a selection of either the button 531 or the button 532. When the button 531 is selected, it means that the automatic update setting is enabled. When the button 532 is selected, it means that the automatic update setting is disabled.

Next, the display control unit 11 indicates the automatic update setting input by the user on the automatic update setting screen 530 to the update unit 12 (S162). For example, the update unit 12 stores the automatic update setting in the auxiliary storage device 102 (S163).

If the version information of the acquired firmware matches the version information of the published firmware in step S131 performed in response to the instruction to turn off the main power, the update unit 12 requests the display control unit 11 to display the update check screen 520 (S151). In addition, the update unit 12 requests the timer control unit 14 to start a no-operation timer (S171). In response to the request from the update unit 12, the timer control unit 14 starts the no-operation timer (S172). The no-operation timer is a timer that measures a predetermined period of time during which no operation is input by the user with respect to the information processing apparatus 10.

If an operation is input by the user on the update check screen 520 before the no-operation timer expires, that is, if the "update" button or the "do not update" button is selected before the no-operation timer expires (S154), the update unit 12 requests the timer control unit 14 to cancel the no-operation timer (S173). In response to the request from the update unit 12, the timer control unit 14 cancels the no-operation timer (S174). That is, the timer control unit 14 stops measuring the predetermined period of time during which no operation is input by the user. Note that the expiration of the no-operation timer means that the predetermined period of time has elapsed.

Conversely, if the control unit 14 detects the expiration of the no-operation timer (S181), the timer control unit 14 indicates the expiration of the no-operation timer to the update unit 12 (S182). In response to the expiration of the no-operation timer, the update unit 12 refers to the automatic update setting stored in the auxiliary storage device 102, and determines whether to update the firmware (S183). That is, if the automatic update setting is enabled, the update unit 12 updates the firmware of the information processing apparatus 10 based on the acquired firmware stored in the firmware storage unit 15 (S184), and shuts down the information processing apparatus 10 (S190). Conversely, if the automatic update setting is disabled, the update unit 12 shuts down the information processing apparatus 10 without updating the firmware (S190).

As described above, according to the fourth embodiment, even when no operation is input by the user on the update check screen 520, a situation in which the main power remains turned on can be avoided.

Note that the fourth embodiment may be applied to a case where no operation is input by the user on the update check screen 510 in the second embodiment.

In the above-described embodiments, the information processing apparatus 10 is not limited to the image forming apparatus as long as a communication function is included. The information processing apparatus 10 may be a projector (PJ), an interactive whiteboard (IWB: a whiteboard having an electronic blackboard function capable of interactive communication), an output apparatus such as digital signage, a head-up display (HUD) apparatus, an industrial machine, an imaging apparatus, a sound collector, medical equipment, a network home appliance, a notebook personal computer (PC), a mobile phone, a smartphone, a tablet terminal, a game console, a personal digital assistant (PDA), a digital camera, a wearable PC, or a desktop PC.

Further, the functions of the above-described embodiments may be implemented by one or more processing circuitries. As used herein, the term "processing circuitry" includes a device such as a processor programmed to cause software to execute the functions, such as a processor implemented by an electronic circuitry, and an application-specific integrated circuit (ASIC), a digital signal processor (DSP), a field-programmable gate array (FPGA), and a circuit module designed to execute the above-described functions.

Further, in the above-described embodiments, the publishing server 20 is an example of another apparatus. The version information of the acquired firmware is an example of first version information. The version information of the published firmware is example of second version information.

Further, the present invention is not limited to the above-described embodiments, and variations and modifications may be made without departing from the scope of the present invention.

What is claimed is:

1. An information processing apparatus comprising
a memory; and
a processor coupled to the memory and configured to
acquire first update data used to update a program and including first version information of the program from another apparatus connected via a network, the program causing the information processing apparatus to execute a process,
acquire second update data used to update the program and including second version information of the program from the another apparatus,
detect a user's operation of turning a main power of the information processing apparatus off;
determine, in response to detecting the user's operation of turning the main power of the information processing apparatus off, whether the first version information is the same as the second version information, the second version information being a latest version of the program available from the another apparatus, and update the program based on the first update data in a case where the first version information is the same as the second version information.

2. The information processing apparatus according to claim 1, wherein the processor is further configured to display a first screen indicating that the first version information is not the latest version and allowing a user to select whether to update the program, in a case where the first version information differs from the second version information, and the processor updates the program and stops the information processing apparatus in response to the user selecting to update the program on the first screen, and stops the information processing apparatus without updating the program in response to the user selecting not to update the program on the first screen.

3. The information processing apparatus according to claim 1, wherein the processor is further configured to display a second screen allowing a user to select whether to update the program, in the case where the first version information matches the second version information, and the processor updates the program and stops the information processing apparatus in response to the user selecting to update the program on the second screen, and stops the information processing apparatus without updating the program in response to the user selecting not to update the program on the second screen.

4. The information processing apparatus according to claim 2, wherein the processor is configured to determine whether to update the program based on preset information, in a case where no operation is input by the user on the first screen for a predetermined period of time.

5. The information processing apparatus according to claim 3, wherein the processor is configured to determine whether to update the program based on preset information, in a case where no operation is input by the user on the second screen for a predetermined period of time.

6. An information processing system comprising:
an information processing apparatus; and
another apparatus, wherein
the information processing apparatus includes a memory, and a processor coupled to the memory and configured to acquire first update data used to update a program and including first version information of the program, from the another apparatus connected via a network, the program causing the information processing apparatus to execute a process, acquire second update data used to update the program and including second version information of the program from the another apparatus after receiving an instruction to stop operation of the information processing apparatus before stopping the operation of the information processing apparatus, detect a user's operation of turning a main power of the information processing apparatus off, determine, in response to detecting the user's operation of turning the main power of the information processing apparatus off, whether the first version information is the same as the second version information, the second version information being a latest version of the program available from the another apparatus, and update the program based on the first update data in a case where the first version information is the same as the second version information.

7. An information processing method performed by an information processing apparatus, the method comprising:

acquiring first update data used to update a program and including first version information of the program, from another apparatus connected via a network, the program causing the information processing apparatus to execute a process, acquiring second update data used to update the program and including second version information of the program from the another apparatus after receiving an instruction to stop operation of the information processing apparatus before stopping the operation of the information processing apparatus, the second version information being a latest version of the program available from the another apparatus, detect a user's operation of turning a main power of the information processing apparatus off, determining, in response to detecting the user's operation of turning the main power of the information processing apparatus off, whether the first version information is the same as the second version information, the second version information being a latest version of the program available from the another apparatus whether the first version information is the same as the second version information, and updating the program based on the first update data in a case where the first version information is the same as the second version information.

8. The information processing apparatus according to claim 1, wherein the processor is further configured to shut down the information processing apparatus after updating the program based on the first update data.

9. The information processing apparatus according to claim 1, wherein the processor is further configured to, after receiving the instruction to stop operation of the information processing apparatus and before stopping the operation of the information processing apparatus and acquiring the second version information of second update data, check whether the first update data is stored in the information processing apparatus and check version information of the first update data that is stored in the information processing apparatus.

10. The information processing apparatus according to claim 1, wherein the processor automatically updates the program based on the first update data upon determining that a predetermined condition is met regardless of receiving the instruction to stop operation of the information processing apparatus, and the processor does not update the program based on the first update data, until receiving the instruction to stop operation of the information processing apparatus, upon determining that the predetermined condition is not met.

11. The information processing apparatus according to claim 1, wherein the predetermined condition includes at least one of a condition that the information processing apparatus is not operated by a user or a condition that the user preliminarily sets.

* * * * *